(12) United States Patent
Ho et al.

(10) Patent No.: US 9,526,047 B1
(45) Date of Patent: Dec. 20, 2016

(54) APPARATUS AND METHOD FOR DECIDING AN OFFLOAD LIST FOR A HEAVILY LOADED BASE STATION

(71) Applicant: Institute For Information Industry, Taipei (TW)

(72) Inventors: Chih-Hsiang Ho, Taipei (TW); Li-Sheng Chen, Yilan (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/961,350

(22) Filed: Dec. 7, 2015

(30) Foreign Application Priority Data

Nov. 19, 2015 (TW) .............................. 104138254 A

(51) Int. Cl.
*H04W 36/00* (2009.01)
*H04W 24/08* (2009.01)
*H04W 88/08* (2009.01)

(52) U.S. Cl.
CPC ......... *H04W 36/0083* (2013.01); *H04W 24/08* (2013.01); *H04W 88/08* (2013.01)

(58) Field of Classification Search
CPC ...... H04W 28/08; H04W 88/08; H04W 36/22; H04W 24/08; H04W 36/0083; H04L 47/125
See application file for complete search history.

(56) References Cited

U.S. PATENT DOCUMENTS

| 6,792,284 B1 | 9/2004 | Dalsgaard et al. |
| 9,094,979 B2 | 7/2015 | Rezaiifar et al. |
| 2004/0136379 A1* | 7/2004 | Liao ..................... H04L 12/5695 370/395.21 |
| 2006/0293060 A1 | 12/2006 | Yang et al. |
| 2008/0049753 A1* | 2/2008 | Heinze ................ H04L 12/5695 370/392 |
| 2009/0156211 A1 | 6/2009 | Hande et al. |
| 2009/0163223 A1 | 6/2009 | Casey |

(Continued)

FOREIGN PATENT DOCUMENTS

TW          201528839 A       7/2015

OTHER PUBLICATIONS

Office Action to the corresponding Taiwan Patent Application No. 104138254 rendered by the Taiwan Intellectual Property Office (TIPO) on Sep. 7, 2016, 9 pages (including English translation).

*Primary Examiner* — Ajit Patel
(74) *Attorney, Agent, or Firm* — Skaar Ulbrich Macari, P.A.

(57) ABSTRACT

An apparatus and method for deciding an offload list for a heavily loaded base station are provided. The heavily loaded base station serves a plurality of user equipments. A part of the user equipments are candidate user equipments, wherein a connection quality parameter of each of the candidate user equipments is smaller than a threshold. Each of the candidate user equipments has an offload utility value and a service level agreement degree. The apparatus selects one of the candidate user equipments as a selected user equipment according to the offload utility values. The apparatus decides to add an identity of the selected user equipment into the offload list according to at least the service level agreement degree of the selected user equipment and a load of a target base station of the selected user equipment.

20 Claims, 5 Drawing Sheets

(56) References Cited

U.S. PATENT DOCUMENTS

| | | | |
|---|---|---|---|
| 2010/0165958 A1* | 7/2010 | Roy | H04W 48/20 370/338 |
| 2011/0136478 A1* | 6/2011 | Trigui | H04W 24/02 455/418 |
| 2012/0026974 A1* | 2/2012 | Fong | H04W 72/1252 370/331 |
| 2012/0307662 A1* | 12/2012 | Puolakka | H04W 24/02 370/252 |
| 2013/0052989 A1 | 2/2013 | Mahalingam | |
| 2014/0079026 A1 | 3/2014 | Dimou et al. | |

* cited by examiner

| Identity | SLA | RSRP |
|---|---|---|
| UE 151 | 1 | -89 dBm |
| UE 152 | 0 | -72 dBm |
| UE 153 | 1 | -95 dBm |
| UE 154 | 0 | -71 dBm |
| UE 155 | 0 | -67 dBm |
| UE 156 | 0 | -88 dBm |
| UE 157 | 0 | -92 dBm |
| UE 158 | 0 | -93 dBm |

| Identity | SLA | RSRP |
|---|---|---|
| UE 151 | 1 | -89 dBm |
| UE 153 | 1 | -95 dBm |
| UE 156 | 0 | -88 dBm |
| UE 157 | 0 | -92 dBm |
| UE 158 | 0 | -93 dBm |

FIG. 1C

| Identity | SLA | RSRP | Offload utility value | Load of the target base station | Handover failure rate |
|---|---|---|---|---|---|
| UE 151 | 1 | -89 dBm | 9 | 0.81 | 0.07 |
| UE 153 | 1 | -95 dBm | 13 | 0.62 | 0.01 |
| UE 156 | 0 | -88 dBm | 20 | 0.31 | |
| UE 157 | 0 | -92 dBm | 3 | 0.65 | |
| UE 158 | 0 | -93 dBm | 7 | 0.62 | |

FIG. 1D

APPARATUS AND METHOD FOR DECIDING AN OFFLOAD LIST FOR A HEAVILY LOADED BASE STATION

PRIORITY

This application claims priority to Taiwan Patent Application No. 104138254 filed on Nov. 19, 2015, which is hereby incorporated by reference in its entirety.

FIELD

The present invention relates to an apparatus and a method for providing a solution for a heavily loaded base station. More particularly, the present invention relates to an apparatus and a method for deciding an offload list for a heavily loaded base station.

BACKGROUND

With the vigorous development of the wireless communication technology, more and more users are obtaining various network services via mobile equipments, which often causes a base station in a wireless communication network heavily loaded. When a base station is heavily loaded, the connection quality of some or all of the mobile equipments served by the base station will be degraded. For example, some mobile equipments would suffer from signal/data loss, transmission latency, and/or a prolonged transmission time or even cannot be connected to the base station. Thus, when the base station is heavily loaded, users become unsatisfied with the network service quality.

There are technologies attempting to provide solutions for heavily loaded base stations; however, these conventional technologies all have drawbacks. Two common solutions are described herein. Regarding the first solution, a base stations has to control its load by itself. When receiving a connection request from a mobile equipment, the base station has to decide whether to accept the connection request of the mobile equipment according to its current traffic condition. The drawback of the first solution is that the base station can only ensure that its load will not be increased. In other words, its load cannot be reduced. Regarding the second solution, load information of base stations are provided to the mobile equipment by a central server. Then, the mobile equipment determines whether to transfer to another base station and to which base station it will be transferred to according to the load information of the base stations and the signal strengths between the mobile equipment and the base stations. The drawback of the second solution is that different mobile equipments may be transferred to the same base station, which causes a base station that was not heavily loaded may become heavily loaded. Moreover, the service level agreement (SLA) used by the mobile equipments is not taken into consideration in these two conventional solutions, so the mobile equipment having a higher SLA value might be disconnected from the base station or transferred to and served by other base stations, which results in lower user satisfaction.

Accordingly, for a heavily loaded base station, there is still an urgent need for providing a solution that can decide which mobile equipments served by the heavily loaded base station should be transferred to other base stations to reduce the load of the heavily loaded base station while still making the user with a higher SLA value satisfied with the transmission quality and not causing a base station that was not heavily loaded become heavily loaded.

SUMMARY

To solve the aforesaid problems, an apparatus and a method for deciding an offload list for a heavily loaded base station are provided.

The apparatus for deciding an offload list for a heavily loaded base station comprises a transceiving interface and a processing unit, wherein the transceiving interface is electrically connected to the processing unit. The transceiving interface is connected to the heavily loaded base station, wherein the heavily loaded base station serves a plurality of user equipments (UEs). A part of the UEs are a plurality of candidate UEs. A connection quality parameter of each of the candidate UEs is smaller than a threshold. Each of the candidate UEs has an offload utility value and a service level agreement (SLA) value. The processing unit selects one of the candidate UEs as a selected UE according to the offload utility values and decides to add an identity of the selected UE into the offload list according to at least the SLA value of the selected UE and a load of a target base station of the selected UE.

A method for deciding an offload list for a heavily loaded base station is adapted for use in an electronic apparatus. The electronic apparatus is connected to the heavily loaded base station. The heavily loaded base station serves a plurality of UEs and a part of the UEs are a plurality of candidate UEs. A connection quality parameter of each of the candidate UEs is smaller than a threshold. Each of the candidate UEs has an offload utility value and an SLA value. The method comprises the following steps of: (a) selecting, by the electronic apparatus, one of the candidate UEs as a selected UE according to the offload utility values and (b) deciding, by the electronic apparatus, to add an identity of the selected UE into the offload list according to at least the service level agreement value of the selected UE and a load of a target base station of the selected UE.

An offload list for a heavily loaded base station is decided by an offload list decision apparatus (which may be a server or a base station). In order to mitigate the load of the heavily loaded base station, the offload list decision apparatus selects the UEs served by the heavily loaded base station that have poor connection qualities as the candidate UEs. The offload list decision apparatus further determines whether to add the identity of some candidate UE(s) into the offload list. The offload list decision apparatus selects one of the candidate UEs each time for analysis and evaluation. Specifically, each of the candidate UEs has an offload utility value and an SLA value. The offload list decision apparatus selects one of the candidate UEs as a selected UE according to the offload utility values and decides whether to add an identity of the selected UE into the offload list according to at least the SLA value of the selected UE and a load of a target base station of the selected UE. The offload list decision apparatus may repeat the aforesaid operations (i.e., select one of the un-analyzed/un-evaluated candidate UE for further analysis/evaluation) until a stop condition is satisfied (e.g., the number of the identities recorded on the offload list is equal to an expected offload count or all candidate UEs have been analyzed/evaluated).

An offload list for a heavily loaded base station is decided via the aforesaid mechanism so that the heavily loaded base station knows which UEs (i.e., the UEs corresponding to the identities recorded on the offload list) served by itself may be offloaded. Thereby, the present invention can reduce the load of a heavily loaded base station. During the process of deciding which UEs' identities may be recorded on the offload list, the present invention takes the following factors into consideration, including the connection quality, the offload utility values, the SLA values of the UEs, and whether it will cause a target base station heavily loaded. According to the above descriptions, the present invention takes the service levels of the UEs served by the heavily loaded base station into consideration and will not cause other base stations heavily loaded. Therefore, the present invention overcomes the drawbacks of the conventional technologies.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1B depicts the identities, SLA values, and connection quality parameters of UEs 151, 152, 153, 154, 155, 156, 157 and 158;

FIG. 1C depicts a candidate list 102 of the first embodiment;

FIG. 1D depicts the identity, the SLA value, the connection quality parameter, the offload utility value, the load of the target base station, and the handover failure rate of each of the candidate UEs.

DETAILED DESCRIPTION

In the following description, an apparatus and a method for deciding an offload list for a heavily loaded base station according to the present invention will be explained with reference to example embodiments thereof. However, these example embodiments are not intended to limit the present invention to any specific examples, embodiments, environment, applications, or implementations described in these example embodiments. Therefore, description of these example embodiments is only for purpose of illustration rather than to limit the scope of the present invention. It shall be appreciated that elements unrelated to the present invention are omitted from depiction in the following embodiments and the attached drawings.

Figure 1A:
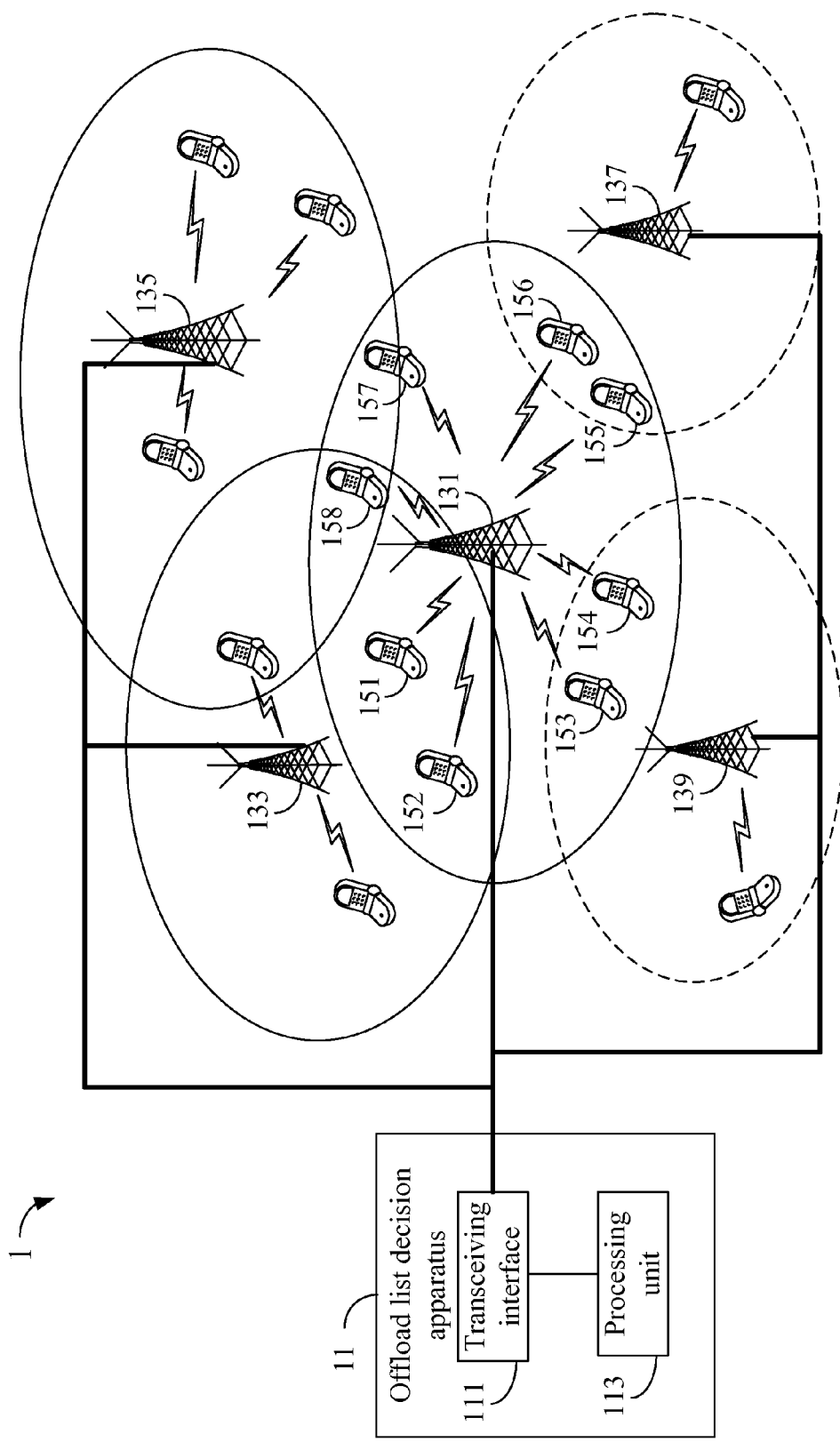
FIG. 1A is a schematic view of a wireless network system 1 of a first embodiment.

A first embodiment of the present invention is a wireless network system 1 and a schematic view illustrating the architecture of the wireless network system 1 is depicted in FIG. 1A. The wireless network system 1 comprises an apparatus (hereinafter referred to as "an offload list decision apparatus") 11 for deciding an offload list for a heavily loaded base station, five base stations 131, 133, 135, 137, and 139, and a plurality of UEs served by the five base stations 131, 133, 135, 137, and 139. It shall be appreciated that the number of the base stations that can be comprised in a wireless network system and the number of the UEs than can be served by a base station are not limited in the present invention. Moreover, a person having ordinary skill in the art shall appreciate that the UEs are any mobile equipments capable of communicating with the base stations.

The offload list decision apparatus 11 comprises a transceiving interface 111 and a processing unit 113 electrically connected to the transceiving interface 111. The processing unit 113 may be any of various processors, central processing units (CPUs), microprocessors, or other computing apparatuses known to those of ordinary skill in the art. The transceiving interface 111 may be any interface that is capable of communicating with the base stations 131, 133, 135, 137, and 139. In this embodiment, the offload list decision apparatus 11 is a server, so the transceiving interface 111 is connected to the base stations 131, 133, 135, 137 and 139 in a wired way (e.g., via twisted pairs, optical fibers, or coaxial cables). In other embodiments, the offload list decision apparatus 11 may be a base station, so the transceiving interface 111 is connected to the base stations 131, 133, 135, 137 and 139 in a wired or wireless way (e.g., via base station antennas).

In this embodiment, the offload list decision apparatus 11 has known that the base station 131 is a heavily loaded base station, so it will decide an offload list for the base station 131. In other words, the offload list decision apparatus 11 decides, for the heavily loaded base station 131, which UE(s) served by the heavily loaded base station 131 can be offloaded and be served by other base stations. It shall be appreciated that how to determine which base stations are heavily loaded and how to decide which heavily loaded base station(s) having higher priorities to be offloaded are not the focuses of the present invention. Moreover, whether and how the base station 131 transfers the UEs listed on the offload list to other base stations after the offload list decision apparatus 11 has decided the offload list for the base station 131 are also not the focuses of the present invention as well.

In this embodiment, the base station 131 serves eight UEs 151, 152, 153, 154, 155, 156, 157, and 158. The base station 131 determines that the connection quality parameter of each of the UEs 151, 153, 156, 157, and 158 is smaller than a first threshold, so the base station 131 treats the UEs 151, 153, 156, 157 and 158 as the candidate UEs (i.e., the candidates for being listed on the offload list). The aforesaid connection quality parameter may be a reference signal received power (RSRP), a reference signal received quality (RSRQ), a signal to interference plus noise ratio (SINR), a signal to noise ratio (SNR), and/or other information that can be used to measure the connection quality. Thereafter, the base station 131 informs the offload list decision apparatus 11 of the candidate UEs (e.g., the base station 131 lists the identities of the candidate UEs in a candidate list and then transmits the candidate list to the offload list decision apparatus 11). The offload list decision apparatus 11 receives information about which UEs being the candidate UEs via its transceiving interface 111. It shall be appreciated that the present invention does not limit the way that a base station informs an offload list decision apparatus of the candidate UEs.

It shall be additionally appreciated that, in some embodiments, each of the UEs 151, 152, 153, 154, 155, 156, 157, and 158 may measure its connection quality parameter and then transmit the connection quality parameter to the offload list decision apparatus 11 via the base station 131. Yet in some embodiments, each of the UEs 151, 152, 153, 154, 155, 156, 157, and 158 may transmit the connection quality parameter to the offload list decision apparatus 11. It shall be appreciated that if the UEs transmit the connection quality parameters to the offload list decision apparatus 11 on their own, the connection quality parameters may be relayed via a base station. Thereafter, the offload list decision apparatus 11 compares the connection quality parameters of the UEs 151, 152, 153, 154, 155, 156, 157, and 158 with the first threshold to decide which UEs are the candidate UEs.

Briefly speaking, whether the connection quality parameters are measured by the base station or the UEs is not limited by the present invention. In addition, whether the candidate UEs are decided by the UEs, the base station, or the offload list decision apparatus are not limited in the present invention as well.

In this embodiment, each of the UEs 151, 153, 156, 157, and 158 has an offload utility value and a service level agreement (SLA) value. The offload utility value of a candidate UE is used to reflect the utility (or benefit) obtained after the candidate UE is transferred to and served by other base station. Thus, the offload utility value of a candidate UE may be decided by a difference between a quality index between the candidate UE and the base station that is currently serving the candidate UE and a quality index between the candidate UE and other base station (i.e., a potential target base station to which the candidate UE can be transferred) that can serve the candidate UE. The offload utility value of a candidate UE may be a value calculated by using the RSRP, the RSRQ, the SINR, the SNR, and/or other similar information. For example, the offload utility value of each of the candidate UEs may be calculated by using the RSRP and the following formula (1):

$$MU(\text{User}_j) = \text{Max}\{\text{RSRP}_{\text{User}_j}^k - \text{RSRP}_{\text{User}_j}^{serving} | k \in \text{Neighbor cell of User}_j\} \quad (1)$$

In the aforesaid formula (1), the function MU( ) represents the offload utility value, the parameter j represents the index of the candidate UE, the parameter $\text{User}_j$ represents the candidate UE whose index is j, Max{ } represents taking the maximum value, the parameter k represents the index of the potential target base station to which the candidate UE $\text{User}_j$ may possibly be transferred to, the parameter $\text{RSRP}_{\text{User}_j}^k$ represents the RSRP between the candidate UE $\text{User}_j$ and the potential target base station whose index is k, and the parameter $\text{RSRP}_{\text{User}_j}^{serving}$ represents the RSRP between the candidate UE $\text{User}_j$ and the base station currently serving the candidate UE $\text{User}_j$. When a candidate UE can be transferred to several potential target base stations, the utility values (or benefit) obtained by transferring the candidate UE to different potential target base stations are calculated first (e.g., the formula (1) calculates a difference between the RSRPs before and after transferring the candidate UE to each of the potential target base stations) and then one of the utility values is selected (e.g., the greatest utility value is selected) as the offload utility value of the candidate UE.

It shall be appreciated that when a candidate UE has only one potential target base station, the one potential target base station is the target base station of the candidate UE. When a candidate UE has several potential target base stations, the selected potential target base station is the target base station of the candidate UE. In the subsequent analysis and evaluation, the offload utility value corresponding to a candidate UE is the offload utility value that can reflect the utility obtained after the candidate UE is transferred to and served by the target base station.

In this embodiment, each of the candidate UEs 151, 153, 156, 157, and 158 calculates its offload utility value on its own and then transmits the offload utility value to the offload list decision apparatus 11 via the base station 131. The offload list decision apparatus 11 receives the offload utility values of the candidate UEs 151, 153, 156, 157, and 158 via its transceiving interface 111. It shall be appreciated that, in some embodiments, the candidate UEs 151, 153, 156, 157, and 158 may transmit the information needed for calculating the offload utility values (e.g., the aforesaid RSRP, the RSRQ, the SINR, the SNR, and/or other similar information) to the base station 131, the base station 131 calculates the offload utility value of each of the candidate UEs 151, 153, 156, 157, and 158, and then the base station 131 transmits the offload utility values of the candidate UEs 151, 153, 156, 157 and 158 to the offload list decision apparatus 11. Moreover, in some embodiments, the candidate UEs 151, 153, 156, 157, and 158 may transmit the information needed for calculating the offload utility values (e.g., the aforesaid RSRP, the RSRQ, the SINR, the SNR, and/or other similar information) to the offload list decision apparatus 11 on their own or via the base station 131. It shall be appreciated that if a candidate UE transmits the information needed for calculating the offload utility value to the offload list decision apparatus 11 on its own, the information may be relayed via a base station. Thereafter, the offload list decision apparatus 11 calculates the offload utility value of each of the candidate UEs 151, 153, 156, 157, and 158.

As described above, each of the candidate UEs 151, 153, 156, 157, and 158 has a SLA value. The SLA value of a candidate UE represents the service quality level agreed between the owner of the candidate UE and the operator of the wireless network system 1. In this embodiment, a smaller SLA value represents a lower service quality level that can be provided by the operator of the wireless network system 1. Each of the candidate UEs 151, 153, 156, 157, and 158 transmits its SLA value to the offload list decision apparatus 11 on its own or via the base station 131. Similarly, if the candidate UEs 151, 153, 156, 157, and 158 transmit the SLA values to the offload list decision apparatus 11 on their own, the SLA values may be relayed via a base station. The offload list decision apparatus 11 receives the SLA values of the candidate UEs 151, 153, 156, 157, and 158 via its transceiving interface 111.

After the offload list decision apparatus 11 has obtained the offload utility values and the SLA values of the candidate UEs 151, 153, 156, 157, and 158, the processing unit 113 of the offload list decision apparatus 11 selects a to-be-analyzed candidate UE as a selected UE (e.g., selects the candidate UE that has the greatest offload utility value as the selected UE) according to the offload utility values of the candidate UEs 151, 153, 156, 157, and 158. Thereafter, the processing unit 113 decides whether to add an identity of the selected UE into the offload list according to at least the SLA value of the selected UE and a load of a target base station of the selected UE. The processing unit 113 of the offload list decision apparatus 11 may repeat the aforesaid operations until a stop condition is satisfied. For example, the stop condition may be that the identity number of the offload list (i.e., the number of the identities listed in the offload list) has reached an expected offload count. As another example, the stop condition may be that there is no other candidate UE (i.e., all candidate UEs have been selected and analyzed). It shall be appreciated that, before the aforesaid operations are repeated, the processing unit 113 removes the selected UE from the candidate UEs to avoid reselecting the candidate UE that has been analyzed. After the stop condition is satisfied, the offload list decision apparatus 11 may output the offload list via its transceiving interface 111.

In the following descriptions, the way that the offload list decision apparatus 11 utilizes the SLA value of the selected UE and the load of the target base station of the selected UE to decide whether to add an identity of the selected UE into the offload list will be detailed.

The processing unit 113 determines whether the SLA value of the selected UE is smaller than a second threshold (i.e., determines whether the selected UE has a lower service level). If the SLA value of the selected UE is smaller than the second threshold, the processing unit 113 further determines whether attaching the selected UE to the target base station (i.e., transferring the selected UE to the target base station so as to be served by the target base station) will cause the target base station heavily loaded according to the load of the target base station of the selected UE. If the processing unit 113 determines that attaching the selected UE to the target base station will not cause the target base station heavily loaded, the processing unit 113 adds the identity of the selected UE into the offload list. If the processing unit 113 determines that attaching the selected UE to the target base station will cause the target base station heavily loaded, the processing unit 113 will not add the identity of the selected UE into the offload list. Briefly speaking, if the selected UE has a lower service level, the offload list decision apparatus 11 decides to add the identity of the selected UE into the offload list as long as attaching the selected UE to the target base station will not cause the target base station heavily loaded.

If the SLA value of the selected UE is not smaller than the second threshold, the processing unit 113 may further perform analysis according to one or a combination of the following three criteria. The first criterion is to determine whether the offload utility value of the selected UE is greater than a third threshold. The second criterion is to determine whether a load of the target base station of the selected UE is smaller than a fourth threshold. The third criterion is to determine whether a handover parameter (e.g., a handover failure rate) of the selected UE is smaller than a fifth threshold. No matter which one(s) of the three criteria is adopted by the processing unit 113 for analysis, only if all the determination results are "yes" will the processing unit 113 further determines whether attaching the selected UE to the target base station will cause the target base station heavily loaded according to the load of the target base station of the selected UE. If the processing unit 113 determines that attaching the selected UE to the target base station will not cause the target base station heavily loaded, the processing unit 113 adds the identity of the selected UE into the offload list. If the processing unit 113 determines that attaching the selected UE to the target base station will cause the target base station heavily loaded, the processing unit 113 will not add the identity of the selected UE into the offload list. Briefly speaking, if the selected UE has a higher service level, the offload list decision apparatus 11 further performs evaluation according to other criteria. Only if all the criteria for evaluation are satisfied without causing the target base station heavily loaded will the offload list decision apparatus 11 decide to add the identity of the selected UE into the offload list.

Hereby, embodiments that perform analysis according to one or a combination of the aforesaid three criteria are provided in the following descriptions.

In some embodiments, if the SLA value of the selected UE is not smaller than the second threshold, the processing unit 113 further performs analysis according to the aforesaid first criterion (i.e., determining whether the offload utility value of the selected UE is greater than the third threshold). In these embodiments, if the processing unit 113 determines that the offload utility value of the selected UE is greater than the third threshold and determines that attaching the selected UE to the target base station will not cause the target base station heavily loaded, the processing unit 113 decides to add the identity of the selected UE into the offload list.

In some embodiments, if the SLA value of the selected UE is not smaller than the second threshold, the processing unit 113 further performs analysis according to the aforesaid first criterion (i.e., determining whether the offload utility value of the selected UE is greater than the third threshold) and the second criterion (i.e., determining whether a load of the target base station of the selected UE is smaller than a fourth threshold). In these embodiments, if the processing unit 113 determines that the offload utility value of the selected UE is greater than the third threshold, determines that the load of the target base station of the selected UE is smaller than the fourth threshold, and determines that attaching the selected UE to the target base station will not cause the target base station heavily loaded, the processing unit 113 decides to add the identity of the selected UE into the offload list.

In some embodiments, if the SLA value of the selected UE is not smaller than the second threshold, the processing unit 113 further performs analysis according to the aforesaid first criterion (i.e., determining whether the offload utility value of the selected UE is greater than the third threshold), the second criterion (i.e., determining whether a load of the target base station of the selected UE is smaller than a fourth threshold), and the third criterion (i.e., determining whether a handover parameter of the selected UE is smaller than a fifth threshold). In these embodiments, if the processing unit 113 determines that the offload utility value of the selected UE is greater than the third threshold, determines that the load of the target base station of the selected UE is smaller than the fourth threshold, determines that the handover parameter of the selected UE is smaller than the fifth threshold, and determines that attaching the selected UE to the target base station will not cause the target base station heavily loaded, the processing unit 113 decides to add the identity of the selected UE into the offload list.

According to the above descriptions, a person having ordinary skill in the art shall appreciate the way that the processing unit 113 of the offload list decision apparatus 1 decides whether to add the identity of the selected UE into the offload list when other combinations of the first criterion, the second criterion, and the third criterion are adopted for analysis. Therefore, the details are not further described herein. It shall be appreciated that if the processing unit 113 of the offload list decision apparatus 11 performs the analysis using several criteria, the order that these criteria are executed is not limited in the present invention. For example, when the processing unit 113 performs the analysis according to the first criterion and the second criterion, the first criterion may be executed before or after the second criterion.

A concrete example is given herein for better understanding. Please refer to FIG. 1B to FIG. 1D. FIG. 1B depicts the identities, the SLA values, and the connection quality parameters of the UEs 151, 152, 153, 154, 155, 156, 157, and 158. In this concrete example, the first threshold to be compared with the connection quality parameter is −80 dBm. Since the connection quality parameter of each of the UEs 151, 153, 156, 157, and 158 is smaller than the first threshold, the UEs 151, 153, 156, 157 and 158 are treated as the candidate UEs and recorded into a candidate list 102 as shown in FIG. 1C. FIG. 1D depicts the identity, the SLA value, the connection quality parameter, the offload utility value, the load of the target base station, and the handover failure rate of each of the candidate UEs. It is noted that the contents of the SLA values, the connection quality parameters, and the offload utility values and the ways to derive them have been described and, hence, will not be further described herein. It shall be appreciated that since each of the target base station is also connected to the offload list decision apparatus 11, each of the target base station transmits an indication of its load to the offload list decision apparatus 11. Furthermore, the handover failure rate of each of the UEs 151, 153, 156, 157, and 158 may be transmitted to the offload list decision apparatus 11 via the base station 131. Or, the UEs 151, 153, 156, 157 and 158 may transmit the handover failure rates to the offload list decision apparatus 11 on their own. Similarly, if the UEs 151, 153, 156, 157 and 158 transmit the handover failure rates to the offload list decision apparatus 11 on their own, the handover failure rates may be relayed via a base station.

In this concrete example, the processing unit 113 of the offload list decision apparatus 11 sorts the candidate UEs on the candidate list 102 according to the offload utility values and selects the candidate UE to be analyzed in each stage according to the order of the sorted candidate UEs until the number of the identities on the offload list is equal to an expected offload count (e.g., three) or all candidate UEs have been analyzed. In other words, the candidate UEs are analyzed by the processing unit 113 in the following order: the UE 156, the UE 153, the UE 151, the UE 158, and the UE 157.

First, the processing unit 113 selects the UE 156 and removes the UE 156 from the candidate list 102. Next, the processing unit 113 determines that the SLA value of the UE 156 is smaller than a second threshold (e.g., 0.5) and further determines that attaching the UE 156 to the target base station will not cause the base station heavily loaded. Based on the aforesaid determination results, the processing unit 113 decides to add the identity of the UE 156 into the offload list.

Since the stop condition (i.e, the number of the identities in the offload list is equal to an expected offload count or all candidate UEs have been analyzed) has not been satisfied, the processing unit 113 selects the UE 153 for analysis and removes the UE 153 from the candidate list 102. The processing unit 113 determines that the SLA value of the UE 153 is not smaller than the second threshold. In this concrete example, the processing unit 113 adopts the aforesaid first criterion, the second criterion, and the third criterion for further analysis. Specifically, the processing unit 113 determines that the offload utility value (i.e., 13) of the UE 153 is greater than a third threshold (e.g., 8), determines that a load (i.e., 0.62) of the target base station of the UE 153 is smaller than a fourth threshold (e.g., 0.8), and determines that a handover parameter (i.e., 0.01) of the UE 153 is smaller than a fifth threshold (e.g., 0.1). Based on the aforesaid determination results, the processing unit 113 decides to add the identity of the UE 153 into the offload list.

Since the stop condition (i.e, the number of identities in the offload list is equal to an expected offload count or all candidate UEs have been analyzed) has not been satisfied, the processing unit 113 selects the UE 151 for analysis and removes the UE 151 from the candidate list 102. The processing unit 113 determines that the SLA value of the UE 151 is not smaller than the second threshold, so the processing unit 113 adopts the first criterion, the second criterion, and the third criterion for further analysis. The processing unit 113 determines that the load of the target base station of the UE 151 is not smaller than the fourth threshold, so the processing unit 113 will not add the identity of the UE 151 into the offload list.

Since the stop condition (i.e, the number of identities in the offload list is equal to an expected offload count or all candidate UEs have been analyzed) has not been satisfied, the processing unit 113 selects the UE 158 for analysis and removes the UE 158 from the candidate list 102. Then, the processing unit 113 determines that the SLA value of the UE 158 is smaller than the second threshold (e.g., 0.5) and further determines that attaching the UE 156 to the target base station will not cause the target base station heavily loaded. Based on the aforesaid determination results, the processing unit 113 decides to add the identity of the UE 158 into the offload list.

At this point, the UE 156, the UE 153, and the UE 158 are listed on the offload list. Since the stop condition (i.e., the number of identities in the offload list is equal to an expected offload count) has been satisfied, the processing unit 113 will not select other UEs on the candidate list 102 for analysis. Subsequently, the offload list decision apparatus 11 may output the offload list to the base station 131 via its transceiving interface 111.

According to the above descriptions, the offload list decision apparatus 11 can decide an offload list for a heavily loaded base station so that the heavily loaded base station knows that the UEs corresponding to the identities recorded on the offload list may be offloaded. During the process of deciding the identity of which UE(s) should be recorded on the offload list, the offload list decision apparatus 11 takes the following factors into consideration: the connection quality, the offload utility values, and the SLA values of the UEs, and whether it will cause a target base station heavily loaded. Clearly, when the offload list decision apparatus 11 provides a solution for a heavily loaded base station, the SLA values of the UEs served by the heavily loaded base station are considered and other base stations will not be harmed by this solution (i.e. will not become heavily loaded). Hence, the offload list decision apparatus 11 overcomes the drawbacks of the conventional technologies.

Figure 2A:
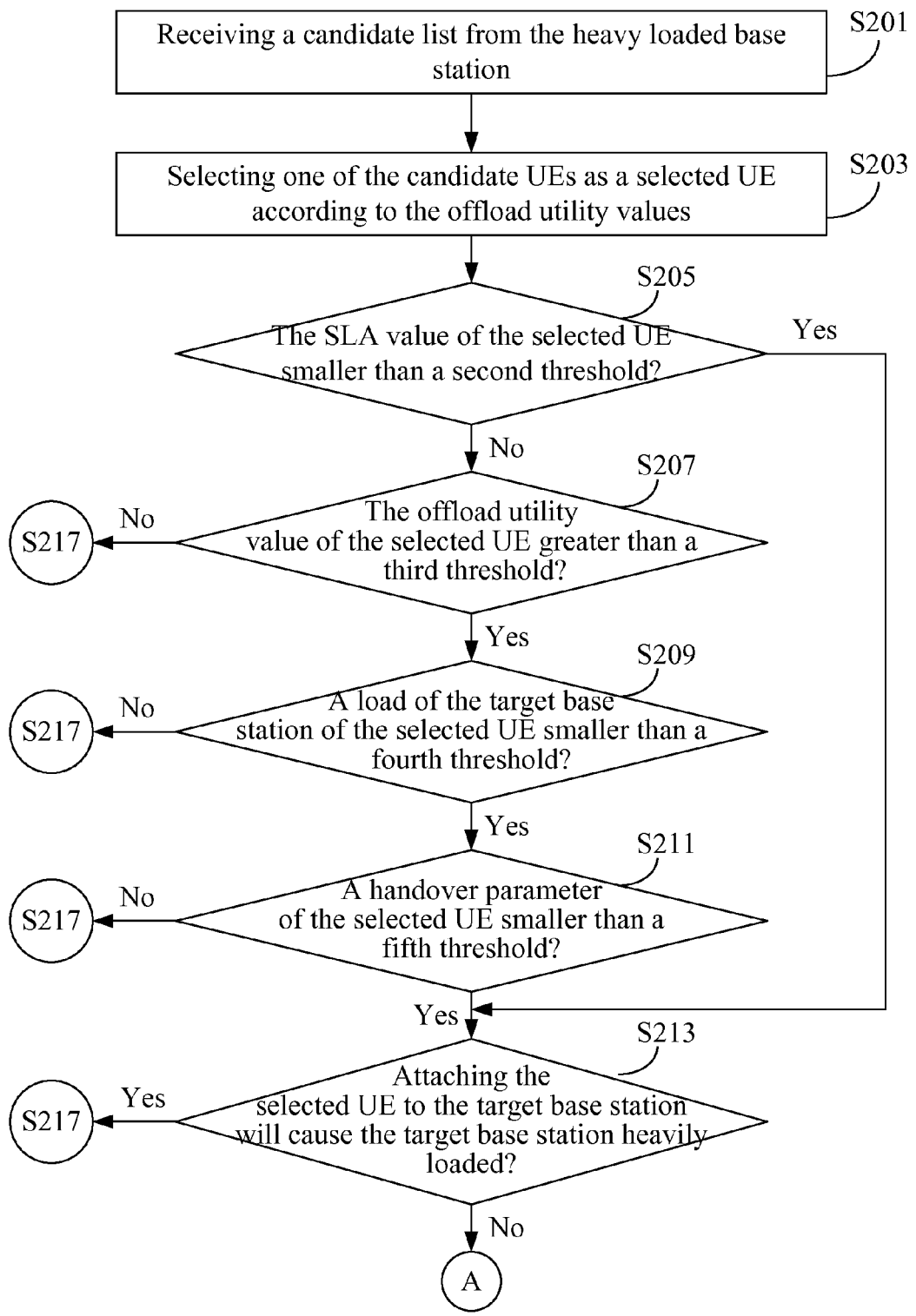
FIG. 2A and FIG. 2B illustrate the flowchart of a second embodiment.
Figure 2B:
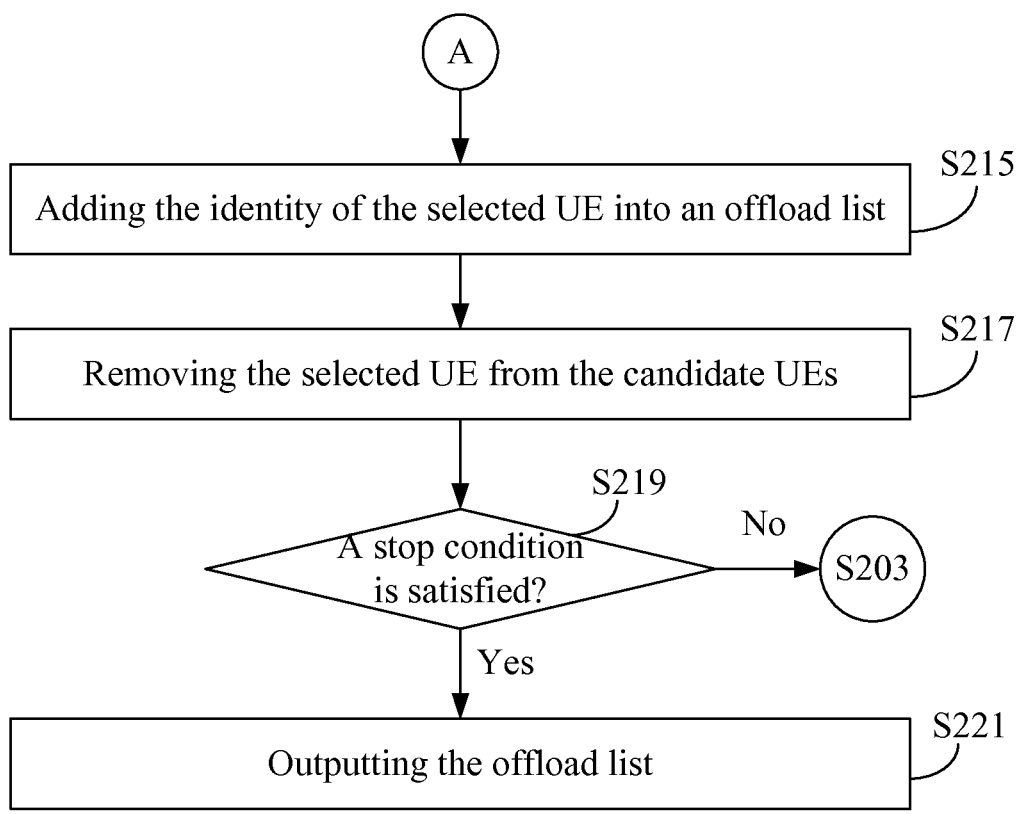

A second embodiment of the present invention is a method for deciding an offload list for a heavily loaded base station and the flowchart diagrams of the method are depicted in FIG. 2A and FIG. 2B. The method is adapted for use in an electronic apparatus (e.g., the offload list decision apparatus 11 described in the first embodiment). The electronic apparatus is connected to the heavily loaded base station and the heavily loaded base station serves a plurality of UEs.

In step S201, a candidate list is received by the electronic apparatus from the heavily loaded base station 131. A plurality of candidate UEs are listed on the candidate list and the candidate UEs are a part of the UEs served by the heavily loaded base station. A connection quality parameter of each of the candidate UEs is smaller than a first threshold and each of the candidate UEs has an offload utility value and an SLA value. Thereafter, in step S203, one of the candidate UEs is selected as a selected UE (e.g., the candidate UE that has the greatest offload utility value is selected as the selected UE) by the electronic apparatus according to the offload utility values.

In step S205, whether the SLA value of the selected UE is smaller than a second threshold is determined by the electronic apparatus. If the determination result of the step S205 is "yes" (which means that the selected UE has a lower service level), step S213 is executed by the electronic apparatus to determine whether attaching the selected UE to the target base station will cause the target base station heavily loaded according to a load of the target base station of the selected UE. If the determination result of the step S213 is "no", then step S215 is executed to add the identity of the selected UE into the offload list by the electronic apparatus. Then, step S217 is executed to remove the selected UE from the candidate UEs by the electronic apparatus. Next, in step S219, whether a stop condition is satisfied (i.e., whether the number of the identities in the offload list has reached an expected offload count or there is no more candidate UE) is determined by the electronic apparatus. If the determination result of the step S219 is "no," the step S203 is executed. If the determination result of the step S219 is "yes," step S221 is executed to output the offload list by the electronic apparatus.

If the determination result of the step S205 is "no" (which means that the selected UE has a higher service level), step S207 is executed by the electronic apparatus to determine whether the offload utility value of the selected UE is greater than a third threshold. If the determination result of the step S207 is "no," the step S217 is executed. If the determination result of the step S207 is "yes," the step S209 is executed by the electronic apparatus to determine whether a load of the target base station of the selected UE is smaller than a fourth threshold. If the determination result of the step S209 is "no," the step S217 is executed. If the determination result of the step S209 is "yes,", step S211 is executed by the electronic apparatus to determine whether a handover parameter of the selected UE is smaller than a fifth threshold. If the determination result of the step S211 is "no," the step S217 is executed. If the determination result of the step S211 is "yes," the step S213 is executed.

It shall be appreciated that the present invention does not limit the order for executing the step S207, the step S209, and the step S211. In other words, in some embodiments, the step S207, the step S209, and the step S211 may be executed in any order. Moreover, some embodiments of the present invention may execute one or a combination of the step S207, the step S209, and the step S211 instead of executing all of the step S207, the step S209, and the step S211. How these embodiments operate shall be readily appreciated by those of ordinary skill in the art based on the above description, and thus will not be further described herein.

In addition to the aforesaid steps, the second embodiment can also execute all the operations and steps set forth in the first embodiment, have the same functions, and deliver the same technical effects as the first embodiment. How the second embodiment executes these operations and steps, have the same functions, and deliver the same technical effects as the first embodiment shall be readily appreciated by those of ordinary skill in the art based on the explanation of the first embodiment, and thus will not be further described herein.

It shall be appreciated that, in the present patent specification and the claims, the terms "first," "second," "third," "fourth," and "fifth" in "the first threshold," "the second threshold," "the third threshold," "the fourth threshold," and "the fifth threshold" are only used to indicate that these thresholds are different kinds of thresholds.

According to the above embodiments, the present invention can decide an offload list for a heavily loaded base station so that the heavily loaded base station knows which UEs (i.e., the UEs corresponding to the identities recorded on the offload list) served by itself may be offloaded to mitigate the load. During the process of deciding the identity of which UE(s) may be recorded on the offload list, the present invention takes the following factors into consideration: the connection quality, the offload utility value, and the SLA value of the UE, and whether it will cause a target base station heavily loaded. In some cases, the load of the target base station of the UE and the previous handover parameters of the UE are further taken into consideration. Therefore, when the heavily loaded base station uses the offload list provided by the present invention to mitigate its load, other base stations will not be harmed (i.e. will not become heavily loaded) and UE(s) having higher SLA value(s) will have better transmission qualities.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for deciding an offload list for a heavily loaded base station, comprising:
   a transceiving interface, being connected to the heavily loaded base station, the heavily loaded base station serving a plurality of user equipments (UEs), a part of the UEs being a plurality of candidate UEs, a connection quality parameter of each of the candidate UEs being smaller than a first threshold, and each of the candidate UEs having an offload utility value and a service level agreement (SLA) value; and
   a processing unit, being electrically connected to the transceiving interface, being configured to select one of the candidate UEs as a selected UE according to the offload utility values, and decide to add an identity of the selected UE into the offload list according to at least the service level agreement value of the selected UE and a load of a target base station of the selected UE.

2. The apparatus of claim 1, wherein the processing unit selects the candidate UE that has the greatest offload utility value as the selected UE.

3. The apparatus of claim 1, wherein the processing unit decides to add the identity of the selected UE into the offload list by determining that the SLA value of the selected UE is smaller than a second threshold and determining that attaching the selected UE to the target base station will not cause the target base station heavily loaded according to the load of the target base station of the selected UE.

4. The apparatus of claim 1, wherein the processing unit decides to add the identity of the selected UE into the offload list by determining that the SLA value of the selected UE is greater than a second threshold, determining that the offload utility value of the selected UE is greater than a third threshold, and determining that attaching the selected UE to the target base station will not cause the target base station heavily loaded according to the load of the target base station of the selected UE.

5. The apparatus of claim 1, wherein the processing unit decides to add the identity of the selected UE into the offload list by determining that the SLA value of the selected UE is greater than a second threshold, determining that the offload utility value of the selected UE is greater than a third threshold, determining that a load of the target base station of the selected UE is smaller than a fourth threshold, and determining that attaching the selected UE to the target base station will not cause the target base station heavily loaded according to the load of the target base station of the selected UE.

6. The apparatus of claim 1, wherein the processing unit decides to add the identity of the selected UE into the offload list by determining that the SLA value of the selected UE is greater than a second threshold, determining that the offload utility value of the selected UE is greater than a third threshold, determining that a load of the target base station of the selected UE is smaller than a fourth threshold, determining that a handover parameter of the selected UE is smaller than a fifth threshold, and determining that attaching the selected UE to the target base station will not cause the target base station heavily loaded according to the load of the target base station of the selected UE.

7. The apparatus of claim 1, wherein the processing unit decides to add the identity of the selected UE into the offload list by determining that the SLA value of the selected UE is greater than a second threshold, determining that the offload utility value of the selected UE is greater than a third threshold, determining that a handover parameter of the selected UE is smaller than a fourth threshold, and determining that attaching the selected UE to the target base station will not cause the target base station heavily loaded according to the load of the target base station of the selected UE.

8. The apparatus of claim 1, wherein the processing unit further decides an expected offload count according to a load of the heavily loaded base station, determines that the number of the identities in the offload list is smaller than the expected offload count, and selects the selected UE after it is determined that the number of the identities in the offload list is smaller than the expected offload count.

9. The apparatus of claim 1, wherein the processing unit further removes the selected UE from the candidate UEs after deciding to add the identity of the selected UE into the offload list, the processing unit further determines that the number of the identities in the offload list is smaller than an expected offload count, the processing unit further determines that there is no other candidate UE, and the transceiving interface further outputs the offload list.

10. The apparatus of claim 1, wherein the processing unit further determines that the number of the identities in the offload list is equal to an expected offload count after deciding to add the identity of the selected UE into the offload list and the transceiving interface further outputs the offload list.

11. A method for deciding an offload list for a heavily loaded base station, the method being adapted for use in an electronic apparatus, the electronic apparatus being connected to the heavily loaded base station, the heavily loaded base station serving a plurality of UEs, a part of the UEs being a plurality of candidate UEs, a connection quality parameter of each of the candidate UEs being smaller than a first threshold, each of the candidate UEs having an offload utility value and a service level agreement (SLA) value, the method comprising:
  (a) selecting, by the electronic apparatus, one of the candidate UEs as a selected UE according to the offload utility values; and
  (b) deciding, by the electronic apparatus, to add an identity of the selected UE into the offload list according to at least the SLA value of the selected UE and a load of a target base station of the selected UE.

12. The method of claim 11, wherein the step (a) selects the candidate UE that has the greatest offload utility value as the selected UE.

13. The method of claim 11, wherein the step (b) comprises:
  determining, by the electronic apparatus, that the SLA value of the selected UE is smaller than a second threshold;
  determining, by the electronic apparatus, that attaching the selected UE to the target base station will not cause the base station heavily loaded according to the load of the target base station of the selected UE; and
  adding, by the electronic apparatus, the identity of the selected UE into the offload list.

14. The method of claim 11, wherein the step (b) comprises:
  determining, by the electronic apparatus, that the SLA value of the selected UE is greater than a second threshold;
  determining, by the electronic apparatus, that the offload utility value of the selected UE is greater than a third threshold;
  determining, by the electronic apparatus, that attaching the selected UE to the target base station will not cause the target base station heavily loaded according to the load of the target base station of the selected UE; and
  adding, by the electronic apparatus, the identity of the selected UE into the offload list.

15. The method of claim 11, wherein the step (b) comprises:
  determining, by the electronic apparatus, that the SLA value of the selected UE is greater than a second threshold;
  determining, by the electronic apparatus, that the offload utility value of the selected UE is greater than a third threshold;
  determining, by the electronic apparatus, that a load of the target base station of the selected UE is smaller than a fourth threshold;
  determining, by the electronic apparatus, that attaching the selected UE to the target base station will not cause the target base station heavily loaded according to the load of the target base station of the selected UE; and
  adding, by the electronic apparatus, the identity of the selected UE into the offload list.

16. The method of claim 11, wherein the step (b) comprises:
  determining, by the electronic apparatus, that the SLA value of the selected UE is greater than a second threshold;
  determining, by the electronic apparatus, that the offload utility value of the selected UE is greater than a third threshold;
  determining, by the electronic apparatus, that a load of the target base station of the selected UE is smaller than a fourth threshold;
  determining, by the electronic apparatus, that a handover parameter of the selected UE is smaller than a fifth threshold;
  determining, by the electronic apparatus, that attaching the selected UE to the target base station will not cause the target base station heavily loaded according to the load of the target base station of the selected UE; and
  adding, by the electronic apparatus, the identity of the selected UE into the offload list.

17. The method of claim 11, wherein the step (b) comprises:
  determining, by the electronic apparatus, that the SLA value of the selected UE is greater than a second threshold;
  determining, by the electronic apparatus, that the offload utility value of the selected UE is greater than a third threshold;
  determining, by the electronic apparatus, that a handover parameter of the selected UE is smaller than a fourth threshold;
  determining, by the electronic apparatus, that attaching the selected UE to the target base station will not cause the target base station heavily loaded; and
  adding, by the electronic apparatus, the identity of the selected UE into the offload list.

18. The method of claim 11, further comprising:
deciding, by the electronic apparatus, an expected offload count according to a load of the heavily loaded base station; and
determining, by the electronic apparatus, that the number of the identities in the offload list is smaller than the expected offload count;
wherein the step (a) selects the selected UE after determining that the number of the identities in the offload list is smaller than the expected offload count.

19. The method of claim 11, further comprising:
removing, by the electronic apparatus, the selected UE from the candidate UEs after the step (b);
determining, by the electronic apparatus, that the number of the identities in the offload list is smaller than an expected offload count;
determining, by the electronic apparatus, that there is no other candidate UE; and
outputting, by the electronic apparatus, the offload list.

20. The method of claim 11, further comprising:
determining, by the electronic apparatus, that the number of the identities in the offload list is equal to an expected offload count after the step (b); and
outputting, by the electronic apparatus, the offload list.

* * * * *